United States Patent [19]

Gergen et al.

[11] Patent Number: 5,043,389

[45] Date of Patent: Aug. 27, 1991

[54] BLENDS OF LINEAR ALTERNATING POLYKETONES, POLYAMIDES AND OLEFIN-CARBOXYLIC ACID COPOLYMERS

[75] Inventors: William P. Gergen, Houston; Joseph M. Machado, Richmond; Dixie G. Waters; Randall P. Gingrich, both of Houston, all of Tex.

[73] Assignee: Shell Oil Company, Houston, Tex.

[21] Appl. No.: 429,913

[22] Filed: Oct. 31, 1989

[51] Int. Cl.$^5$ .............................................. C08L 77/06
[52] U.S. Cl. .................................... 525/179; 525/539; 525/919
[58] Field of Search ........................ 525/179, 539, 919

[56] References Cited

U.S. PATENT DOCUMENTS

| | | | |
|---|---|---|---|
| 3,694,412 | 9/1972 | Nozaki | 260/63 CQ |
| 4,174,358 | 11/1979 | Epstein | 525/183 |
| 4,839,437 | 6/1989 | Gergen et al. | 525/426 |
| 4,874,819 | 10/1989 | George et al. | 525/185 |

FOREIGN PATENT DOCUMENTS 121965 10/1984 European Pat. Off. .
257663 3/1988 European Pat. Off. .

*Primary Examiner*—John C. Bleutge
*Assistant Examiner*—Thomas Hamilton, III
*Attorney, Agent, or Firm*—Denise Y. Wolfs

[57] ABSTRACT

Polymer blends exhibiting improved mechanical properties of strength and toughness comprise blends of a major proportion of a linear alternating polymer of carbon monoxide and at least one ethylenically unsaturated hydrocarbon with minor proportions of a polymeric polyamide and a polymer of an α-olefin and an α,β-ethylenically unsaturated carboxylic acid having an optional third monomer and optional partial neutralization of the carboxylic acid groups by non-alkali metal.

20 Claims, No Drawings

BLENDS OF LINEAR ALTERNATING POLYKETONES, POLYAMIDES AND OLEFIN-CARBOXYLIC ACID COPOLYMERS

RELATED PATENT APPLICATIONS

U.S. Pat. application Ser. No. 187,790 filed Apr. 29, 1988, now U.S. Pat. No. 4,839,437 having a common assignee, relates to blends of similar linear alternating polymers and crystalline polyamide.

U.S. Pat. application Ser. No. 278,098 filed Nov. 30, 1988, now U.S. Pat. No. 4,960,838 having a common assignee, relates to blends of similar linear alternating polymers and amorphous polyamide.

U.S. Pat. pplication Ser. No. 203,960 filed Jun. 8, 1988, now U.S. Pat. No. 4,874,819 having a common assignee, relates to blends of similar linear alternating polymers and copolymers of an $\alpha$-olefin and an $\alpha,\beta$-ethylenically unsaturated carboxylic acid.

FIELD OF THE INVENTION

This invention relates to an improved polymer blend comprising predominately a linear alternating polymer of carbon monoxide and at least one ethylenically unsaturated hydrocarbon. More particularly, the invention relates to blends of the linear alternating polymer with a polyamide and an $\alpha$-olefin/unsaturated carboxylic acid polymeric material.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. G.B. 1,081,304 produced similar polymers of higher carbon monoxide content in the presence of alkylphosphine complexes of palladium salts as catalyst. Nozaki extended the reaction to produce linear alternating polymers in the presence of arylphosphine complexes of palladium moieties and certain inert solvents. See, for example, U.S. Pat. No. 3,964,412.

More recently, the class of linear alternating polymers of carbon monoxide and at least one ethylenically unsaturated hydrocarbon has become of greater interest in part because of the greater availability of the polymers. These polymers, often referred to as polyketones or polyketone polymers, have been shown to be of the repeating formula —CO—A— wherein A is a moiety of the ethylenically unsaturated hydrocarbon polymerized through the ethylenic unsaturation. For example, when the hydrocarbon is ethylene the linear alternating polymer is represented by the repeating formula —CO$+$CH$_2$—CH$_2+$. The general processes for the more recent production of these linear alternating polymers is illustrated by a number of published European patent applications including 121,965, 181,014, 213,671, and 257,663. The process typically involves a catalyst composition formed from a compound of a Group VIII metal selected from palladium, cobalt or nickel, an anion of a non-hydrohalogenic acid having a pKa below about 6, preferably below 2, and a bidentate ligand of phosphorus, arsenic or antimony.

The resulting polymers are relatively high molecular weight thermoplastics having established utility in the production of shaped articles by methods which are well known for the processing of thermoplastics. For some applications, however, it has been found to be desirable to have properties which are somewhat different from those of the polyketone polymer. It would be of advantage to retain the more desirable properties of the polyketone polymers and yet improve other properties. These advantages are often obtained through the provision of a polymer blend.

SUMMARY OF THE INVENTION

The present invention provides blends of linear alternating polymer of carbon monoxide and at least one ethylenically unsaturated hydrocarbon and certain other polymeric materials. More particularly, the invention provides blends having a major proportion of the linear alternating polymer and lesser amounts of polymeric polyamide and a copolymeric material containing moieties of an $\alpha$-olefin and an $\alpha,\beta$-ethylenically unsaturated carboxylic acid. Such blends demonstrate improved toughness and strength as compared to the unblended linear alternating polymer.

DESCRIPTION OF THE INVENTION

The polyketone polymers which are employed as the major component of the blends of the invention are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other $\alpha$-olefins including propylene, 1-butene, isobutylene, 1-hexene, and 1-dodecene, or are arylaliphatic containing an aryl substituent or an otherwise aliphatic molecule, particularly an aryl substituent or a carbon atom of the ethylenic unsaturation. Illustrative of this latter class of ethylenically unsaturated hydrocarbons are styrene, p-methylstyrene, p-ethylstyrene, and m-isopropylstyrene. Preferred polyketone polymers are copolymers of carbon monoxide and ethylene or terpolymers of carbon monoxide, ethylene, and a second hydrocarbon of at least 3 carbon atoms, particularly an $\alpha$-olefin such as propylene.

The structure of the polyketone polymer is that of a linear alternating polymer and the polymer will contain substantially one molecule of carbon monoxide for each molecule of ethylenically unsaturated hydrocarbon. When the preferred terpolymers of carbon monoxide, ethylene, and a second hydrocarbon are employed in the blends of the invention, there will be at least two units incorporating a moiety of ethylene for each unit incorporating a moiety of the second hydrocarbon. Preferably there will be from about 10 units to about 100 units incorporating a moiety of ethylene for each unit incorporating a moiety of the second hydrocarbon. The polymer chain of the preferred polymers is therefore represented by the repeating formula

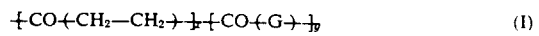  (I)

wherein G is the moiety of an ethylenically unsaturated hydrocarbon of at least 3 carbon atoms polymerized through the ethylenic unsaturation thereof. The —CO$+$CH$_2$—CH$_2+$ units and the —CO$+$G$+$ units are found randomly throughout the polymer chain and the ratio of y:x is no more than about 0.5. In the modification of the blends of the invention where copolymers are employed, there will be no second hydrocarbon present and y is 0. When y is other than 0, i.e., terpolymers are employed, preferred ratios of y:x are from about 0.01 to about 0.1. The end groups or "caps" of the polymer chain will depend upon what materials were present during the production of the polymer and whether or how the polymer was purified. The precise properties of the polymer will not apparently depend upon the nature of the end groups to any considerable extent so that the polymer is fairly represented by the formula for the polymer chain as above depicted. Of broad interest are the polymers of number average molecular weight from about 1,000 to about 200,000, particularly those polymers of number average molecular weight from about 20,000 to about 90,000, as determined by gel permeation chromatography. Typical melting points of such polymers are from about 175° C. to about 300° C., more frequently from about 210° C. to about 270° C. The polymers will have a limiting viscosity number (LVN), measured in a standard capillary viscosity measuring device in m-cresol at 60° C. of from about 0.5 dl/g to about 10 dl/g, preferably from about 0.8 dl/g to about 4 dl/g. Particularly preferred are terpolymers of carbon monoxide, ethylene and propylene having an LVN, measured in m-cresol at 60° C., of from about 1.6 dl/g to about 2.1 dl/g.

A method of producing the polyketone polymers which is now becoming conventional is to contact the carbon monoxide and ethylenically unsaturated hydrocarbon reactant(s) under polymerization conditions in the presence of a reaction diluent and a catalyst composition formed from a palladium compound, the anion of a non-hydrohalogenic acid having a pKa (measured in water at 18° C.) below about 6 and a bidentate phosphorus ligand. The scope of the polymerization process is extensive but, without wishing to be limited, a preferred catalyst composition is formed from a palladium carboxylate, particularly palladium acetate, an anion of trifluoroacetic acid or p-toluenesulfonic acid and a bidentate phosphorus ligand selected from 1,3-bis(diphenylphosphino) propane or 1,3-bis[di(2-methoxyphenyl) phosphino] propane. Such a process is illustrated by the above published European patent applications.

The reaction diluent is preferably an alkanol such as methanol or ethanol and methanol is preferred. The reactants are contacted in a suitable reaction vessel and reactant/catalyst contact is maintained during polymerization by conventional procedures such as shaking or stirring. Suitable reaction temperatures are from about 20° C. to about 150° C. but temperatures from about 50° C. to about 135° C. are more commonly employed. Typical reaction pressures are from about 1 atmosphere to about 200 atmospheres but more often from about 10 atmospheres to about 100 atmospheres. Subsequent to reaction the polymerization is terminated as by cooling the reactor and contents and releasing the pressure. The polyketone product is generally obtained as a material substantially insoluble in the reaction diluent and is recovered by well known procedures such as filtration or decantation. The polyketone is used as recovered or is purified as by contact with a solvent or extraction agent selective for catalyst residues.

The second component of the blends of the invention, present as a minor component, is a polymeric polyamide. By the term "polyamide" is meant a condensation product which contains recurring amide groups as integral parts of a polymeric chain. These polymeric polyamides are well known in the art and are often referred to as Nylons. Suitable polyamides for use in the blends of the invention are crystalline or amorphous polymers of linear or branched structure and a molecular weight of at least about 5,000. The preferred polyamides are linear in structure, wherein each recurring monomeric unit has up to 16 carbon atoms inclusive, and have melting points in excess of about 200° C.

In one embodiment of the polyamide blend component, the polyamide is homopolymeric in character illustratively being a homopolymer of a terminal aminocarboxylic acid of up to 16 carbon atoms inclusive, although in practice the monomeric unit is typically provided as a lactam, e.g., butyrolactam, caprolactam or lauryllactam. Such polyamides are often named in terms of the number of carbon atoms in the monomeric units. For example, the polyamide derived from caprolactam is termed Nylon 6.

In another embodiment the polyamide blend component is copolymeric in character and is illustratively represented as a condensation product of a primary diamine and a dicarboxylic acid. The primary diamine is preferably a terminal primary diamine having up to 16 carbon atoms inclusive and at least 2 carbon atoms between the primary amino groups located on terminal carbon atoms of the diamine structure. The diamines suitably contain aromatic moieties linking the amino groups as illustrated by phenylenediamine, 4,4'-diaminobiphenyl and di(4-aminophenyl) ether, or the linking group is cycloaliphatic as in the case of di(4-aminocyclohexyl)methane or 1,4-diaminocyclooctane. The preferred diamines, however, are acyclic terminal primary diamines of the formula $$H_2N\text{---}(CH_2)_n\text{---}NH_2 \qquad (II)$$

wherein n is an integer from 2 to 16 inclusive. Such polymethylenediamines include trimethylenediamine, tetramethylenediamine, hexamethylenediamine, decamethylenediamine, dodecamethylenediamine and hexadecamethylenediamine. Of these diamines, hexamethylenediamine is preferred.

The dicarboxylic acid suitably has up to 16 carbon atoms inclusive as illustrated by aromatic dicarboxylic acids such as isophthalic acid, terephthalic acid, and 2,6-naphthalenedicarboxylic acid. The preferred dicarboxylic acids, however, are aliphatic dicarboxylic acids, particularly those of the formula $$HO_2C\text{---}(CH_2)_m\text{---}CO_2H \qquad (III)$$

wherein m is an integer from 0 to 14 inclusive. Illustrative of such dicarboxylic acids are oxalic acid, pimelic acid, sebacic acid, suberic acid, azelaic acid, undecanedioic acid, and adipic acid. Adipic acid is particularly preferred.

The production of the polyamide blend components is well known and conventional in the art. It should be understood that although the copolymeric polyamides are represented above as the condensation product of dicarboxylic acids and primary diamines, this representation is for convenience and clarity and the acid monomer may suitably be provided in an equivalent form, e.g., as the dialkyl ester of the dicarboxylic acid. The copolymeric polyamides are often named in terms of the number of carbon atoms in the amine and the acid monomers. For example, the condensation product illustratively produced from hexamethylenediamine and adipic acid is termed Nylon 6,6. The polyamide illustratively produced from hexamethylenediamine and dodecanedioic acid is termed Nylon 6,12. Preferred polyamides are Nylon 6 and Nylon 6,6.

The polyamide blend component is present as a minor component of the blends of the invention. For some applications, the presence of polyamide in amounts as low as about 1% by weight, based on total blend, is satisfactory. A quantity of the polyamide of about 30% by weight on the same basis represents a practical upper limit for the polyamide in blends in which the linear alternating polymer is the major component. Attempts to prepare such blends having more than about 30% by weight of polyamide are largely unsuccessful because of processing difficulties. Preferred blends of the invention contain from about 10% by weight to about 25% by weight of polyamide, based on total blend. Blends containing from about 15% by weight to about 25% by weight of polyamide on the same basis are particularly preferred.

The third component of the blends of the invention, also a minor component, is a polymer of an $\alpha$-olefin and an ethylenically unsaturated carboxylic acid, optionally containing a third monomer and optionally having a portion of the carboxylic acid groups of the polymer neutralized with a non-alkali metal. The $\alpha$-olefin monomer of the blend component is an $\alpha$-olefin of up to 10 carbon atoms inclusive such as ethylene, propylene, styrene, 1-butene, 1-octene, and 1-decene. Preferred $\alpha$-olefins are straight chain $\alpha$-olefins of up to 4 carbon atoms inclusive and particularly preferred is ethylene. The $\alpha$-olefin monomer of this third blend component is preferably present in at least 65% by mole, based on total polymer, and is preferably present in at least 80% by mole on the same basis.

The unsaturated carboxylic acid monomer of the blend component is an $\alpha, \beta$-ethylenically unsaturated carboxylic acid of up to 10 carbon atoms inclusive and is illustrated by acrylic acid, 2-hexenoic acid, 2-octenoic acid, and 2-decenoic acid. The preferred $\alpha,\beta$-ethylenically unsaturated carboxylic acids have up to 4 carbon atoms inclusive. These are acrylic acid, methacrylic acid, and crotonic acid, of which acrylic acid and methacrylic acid are particularly preferred. The unsaturated carboxylic acid monomer of the blend component is present in an amount of from about 1% by mole to about 35% by mole, based on total polymer, but amounts of unsaturated acid from about 5% by mole to about 20% by mole on the same basis are preferred.

The polymeric third blend component is suitably a copolymer of the $\alpha$-olefin and the $\alpha,\beta$-ethylenically unsaturated carboxylic acid and in general such copolymers are preferred. On occasion, however, it is useful to incorporate as an optional monomer a non-acidic low molecular weight polymerizable monomer of up to 8 carbon atoms inclusive. Such optional third monomer may be another $\alpha$-olefin such as propylene or styrene, when the major $\alpha$-olefin monomer is ethylene, an unsaturated esters such as vinyl acetate, methyl methacrylate or butyl acrylate, an unsaturated halohydrocarbons such as vinyl chloride and vinyl fluoride or an unsaturated nitrite such as acrylonitrile. As previously stated, the presence of the third monomer is optional and is not required. When the third monomer is present, amounts of the third monomer up to about 5% by mole, based on total polymer are satisfactory with amounts up to about 3% by mole on the same basis being preferred.

Independent of whether the polymer of the third component is a copolymer or a terpolymer, in an optional embodiment of this blend component a portion of the acid groups of the polymer are neutralized with a non-alkali metal. When partially neutralized, the blend component is polymeric in form while exhibiting ionic character and is conventionally referred to as a metal ionomer. In the partially neutralized embodiment, the $\alpha$-olefin/unsaturated carboxylic acid polymer, with or without third monomer present, is reacted with a source of ionizable metal, particularly zinc, aluminum or magnesium compound sufficient to neutralize up to about 90% of the carboxylic acid groups present in the polymer. Such neutralization, particularly with zinc, the preferred metal, results in a uniform distribution of the metal throughout the polymer. Neutralization of from about 20% to about 80% of the carboxylic acid groups present is preferred and neutralization of from about 25% to about 75% of the carboxylic acid groups is particularly preferred. The ionizable metal compound utilized in the neutralization is a source of uncomplexed non-alkali metal ions including zinc ions, aluminum ions and magnesium ions which are provided in compounds of the type often referred to as metal salts, e.g., zinc chloride, zinc acetate, and zinc formate, or is a source of complexed metal ions wherein the metal is bonded to two types of groups, at least one of which is readily ionized from the metal and at least one other is not. Illustrative of such complexed metal ions are mixed zinc salts with one weak acid such as oleic acid or stearic acid and one more ionizable acid such as acetic acid or formic acid. In general, neutralization with a complexed zinc ion is more preferred.

The optionally partially neutralized polymers employed as the third blend component of the invention are broadly conventional and many are commercial. Non-neutralized polymers include copolymers of ethylene and acrylic acid which are marketed by DuPont under the trademark PRIMACORE ® and copolymers of ethylene and methacrylic acid which are marketed by DuPont under the trademark NUCREL ®. Partially neutralized polymers are marketed by DuPont under the trademark SURLYN ®. The amount of the third component in the blends of the invention is not critical and quantities from about 0.05% by weight to about 10% by weight, based on total blend are satisfactory. Quantities of third component from about 0.1% by weight to about .5% by weight on the same basis are preferred.

The method of producing the blends of the linear alternating polymer, the polyamide, and the polymeric third component is important. In one aspect there needs to be sufficient mixing such that a relatively uniform distribution of the other components throughout the polyketone polymer is obtained. In another aspect, there needs to be sufficient time in the melt so that interphase adhesion is attained. This time depends primarily on the temperature of mixing, the particular components and their relative amounts. Typical mixing times are 2 to 10 minutes, preferably at least 4 minutes. The blend is a non-miscible blend in which the polyamide and the polymeric third component exist as discrete phases in the continuous polyketone phase. The blend will not, of course, be homogeneous but good results are obtained if the distribution of the polyamide and the polymeric third component are uniform throughout the polyketone polymer matrix. The method of blending the components is that which is conventional for the blending of non-miscible polymeric materials to produce a mixture which will not delaminate on processing. In one modification the materials are extruded employing a twin screw corotating extruder operating at high RPM. In an alternate modification the components are blended in a mixing device which exhibits high shear and high thermal energy.

The blends of the invention may contain conventional additives such as antioxidants, stabilizers, fillers, fire-resistant materials, mold release agents, and other substances which are added to improve the processability of the blend components or to modify the properties of the blend. Such additives are incorporated by conventional methods prior to, together with or subsequent to the blending of the components.

The blends of the invention are characterized by improved mechanical properties, particularly properties of strength and toughness. The blends are therefore of particularly utility where molded or otherwise shaped parts are desired which require toughness and strength. Such applications include the production of both internal and external parts for automotive application and structural parts for utilization in the construction industry. The blends are processed for such applications by means of the usual techniques such as extrusion, injection molding, and thermoforming.

The invention is further illustrated by the following Illustrative Embodiments which should not be construed as limiting the invention.

ILLUSTRATIVE EMBODIMENT I

A linear alternating terpolymer of carbon monoxide, ethylene, and propylene [88/023] was produced in the presence of a catalyst composition formed from palladium acetate, trifluoroacetic acid and 1,3-bis[di(2-methoxyphenyl)phosphino]-propane. The polymer had a melting point of 223° C. and a limiting viscosity number (LVN) of 1.81 dl/g.

ILLUSTRATIVE EMBODIMENT II

Blends were prepared of the terpolymer of Illustrative Embodiment I and ZYTEL ® 101, a commercially available Nylon 6,6. All blends also contained 1 pph of NUCREL ® 535, a commercially available copolymer of ethylene and methacrylic acid, and 0.5% by weight of A0330, a commercial antioxidant. The blends were compounded using a Haake 30 mm twin screw corotating extruder with an L/D ratio of 13. The extruder operated at a temperature of 285° C. in an atmosphere of air. Subsequent to the blending, specimens of the blends were injection molded on a 25 mm Arburg molding machine with L/D equal to 18. Molded specimens were stored over dessicant until tested.

Specimens prepared from a number of blends of varying Nylon content were evaluated for notched Izod impact strength at 23° C. and at 0° C. by a standard technique. The results are shown in Table I.

TABLE I

| Specimen, % by Weight of Nylon 6,6 | Notched Izod (ft. lb./in.) | |
|---|---|---|
| | 23° C. | 0° C. |
| 0 | 3.8 | 0.9 |
| 5 | 3.7 | 1.3 |
| 10 | 3.6 | 1.2 |
| 15 | 4.2 | 1.6 |
| 20 | 7.1 | 1.8 |
| 25 | 5.0 | 1.7 |
| 30 | 4.4 | 1.5 |

The tensile modulus of these same blends was determined by standard techniques. The results are shown in Table II, together with the calculated tensile modulus based on additive moduli of the components.

TABLE II

| Specimen, % by Weight of Nylon 6,6 | Modulus (ksi) | |
|---|---|---|
| | Determined | Calculated |
| 0 | 222 | 222 |
| 5 | 236 | 231 |
| 10 | 250 | 240 |
| 15 | 282 | 248 |
| 20 | 290 | 258 |
| 25 | 275 | 262 |
| 30 | 270 | 274 |

The yield stress for these blends was also determined as a function of composition by standard techniques. The results are shown in Table IV together with the calculated yield stress based on additive values for the individual components.

TABLE IV

| Specimen, % by Weight of Nylon 6,6 | Yield Stress (ksi) | |
|---|---|---|
| | Determined | Calculated |
| 0 | 9.0 | 9.0 |
| 5 | 9.1 | 9.1 |
| 10 | 9.2 | 9.3 |
| 15 | 9.4 | 9.4 |
| 20 | 9.5 | 9.6 |
| 25 | 10.2 | 9.8 |
| 30 | 10.6 | 10.0 |

The values for Gardner impact were also determined for these blends at 23° C. and at −30° C. The results are shown in Table V.

TABLE V

| Specimen, % by Weight of Nylon 6,6 | Gardner Impact Strength (in lb) | |
|---|---|---|
| | 23° C. | −30° C. |
| 0 | >400 | 363 |
| 5 | >400 | 141 |
| 10 | >400 | 105 |
| 15 | 390 | 21 |
| 20 | 205 | 16 |
| 25 | 91 | ~0 |
| 30 | 30 | ~0 |

ILLUSTRATIVE EMBODIMENT III

By procedures substantially similar to that of Illustrative Embodiment I, a series of linear alternating terpolymers was produced of varying molecular weight. For each of these terpolymers, the limiting viscosity number (LVN) in m-cresol at 60° C. was measured and melting points were between 220° C. and 225° C. Blends of the polymers were produced and specimens obtained according to the procedure of Illustrative Embodiment II, with each blend containing 20% by weight of the Nylon 6,6 and 1% by weight of NUCREL ® 535. The notched Izod impact strength for these blends was determined at 23° C. and 0° C. by standard techniques and the results are shown in Table VI.

TABLE VI

| LVN, dl/g | Notched Izod Impact Strength (Ft. Lb./In.) | |
|---|---|---|
| | 23° C. | 0° C. |
| 1.31 | 2.8 | 1.3 |
| 1.53 | 4.2 | 1.2 |
| 1.73 | 4.3 | 1.5 |

TABLE VI-continued

| LVN, dl/g | Notched Izod Impact Strength (Ft. Lb./In.) | |
|---|---|---|
| | 23° C. | 0° C. |
| 1.78 | 12.7 | 1.7 |
| 1.79 | 21.4 | 2.7 |
| 1.81 | 9.6 | 1.9 |

ILLUSTRATIVE EMBODIMENT IV

A series of blends was produced from a linear alternating terpolymer prepared by a procedure substantially similar to that of Illustrative Embodiment I. The blends were prepared using the terpolymer and ZYTEL® 101 in an 80/20 ratio with varying amounts of NUCREL® 535. Specimens were produced according to the procedure of Illustrative Embodiment II. However, certain of the specimens were prepared employing a short residence time in the molding machine, e.g., about 25 seconds, while other specimens were produced with a longer residence time, e.g., about 3 minutes. The notched Izod impact strength values were determined for both sets of specimens and the results are shown in Table VII.

TABLE VII

| NUCREL® 535, % by Weight | Notched Izod (Ft. Lb./In.) | |
|---|---|---|
| | Short Residence | Long Residence |
| 0.0 | 4.5 | 8.0 |
| 0.1 | 4.6 | 9.2 |
| 0.3 | 4.6 | 14.0 |
| 1.0 | 5.2 | 18.6 |
| 3.0 | 5.3 | 7.8 |
| 10.0 | 2.0 | 1.3 |

ILLUSTRATIVE EMBODIMENT V

A series of blends of a linear alternating terpolymer produced according to the general procedure of Illustrative Embodiment I were prepared according to the procedure of Illustrative Embodiment II. The blends contained the terpolymer and ZYTEL® 101 in an 80/20 weight ratio and 1% by weight of acidic materials including a number within the scope of the third component of the blends of the invention. Specimens having short and long residence times were made according to Illustrative Embodiment II and the Notched Izod values for the blends were determined by standard techniques. The results are shown in Table VIII.

TABLE VIII

| Additive | Notched Izod (Ft. Lb./In.) | |
|---|---|---|
| | Short Residence | Long Residence |
| None | 4.5 | 8 |
| NUCREL® 535 | 6.5 | 16.4 |
| Zinc SURLYN® | 8.1 | 19.2 |
| PRIMACORE® | 6.0 | 17.9 |
| Stearic acid | 15.9 | 6.0 |
| Polyacrylic acid | 2.3 | — |

ILLUSTRATIVE EMBODIMENT VI

By a procedure substantially similar to that of Illustrative Embodiment I, two copolymers of carbon monoxide and ethylene were produced. The first copolymer had an LVN, measured in m-cresol at 60° C. of 1.68 dl/g and a melting point of 246° C. The second copolymer had an LVN, measured in m-cresol of 1.86 dl/g and a melting point of 245° C. Blends of these copolymers containing 20% by weight of ZYTEL® 101 and 1% by weight of NUCREL® 535 and specimens of the blends were produced according to the procedure of Illustrative Embodiment II. Certain of the specimens were produced with a short residence time in the molding machine (17 seconds) and other specimens were produced with long residence times (2 minutes). Notched Izod values for the blends, as well as for the unblended copolymers were determined by standard techniques. The results are shown in Table IX.

TABLE IX

| Specimen | Notched Izod (Ft. Lb./In.) | |
|---|---|---|
| | Short Residence | Long Residence |
| First copolymer blend | 16.3 | 21.4 |
| Second copolymer blend | 19.2 | — |

The values for the first and second copolymers were 4.5 and 5.3, respectively.

What is claimed is:

1. A polymer blend comprising (a) a major proportion of a linear alternating polymer of carbon monoxide and at least one ethylenically unsaturated hydrocarbon, (b) a lesser proportion of a polymeric polyamide having recurring amide groups in the polymeric chain, and (c) a lesser proportion of an acidic polymer of an $\alpha$-olefin and an $\alpha, \beta$-ethylenically unsaturated carboxylic acid, incorporating a non-acidic low molecular weight monomer, wherein up to 90% of the carboxylic acid groups are neutralized with a non-alkali metal selected from zinc, aluminum or magnesium.

2. The blend of claim 1 wherein the linear alternating polymer is represented by the repeating formula

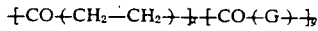

wherein G is the moiety of an ethylenically unsaturated hydrocarbon of at least 3 carbon atoms polymerized through the ethylenic unsaturation and the ratio of y:x is no more than about 0.5.

3. The blend of claim 2 wherein the acidic polymer is a copolymer.

4. The blend of claim 3 wherein the acidic polymer is a copolymer of ethylene and acrylic acid or methacrylic acid.

5. The blend of claim 4 wherein the polyamide is a homopolymer of a terminal aminocarboxylic acid of up to 16 carbon atoms inclusive.

6. The blend of claim 5 wherein the aminocarboxylic acid is provided as caprolactam.

7. The blend of claim 4 wherein the polyamide is a copolymer of a terminal primary diamine of up to 16 carbon atoms inclusive having at least two carbon atoms between the terminal primary amino groups and an aromatic or aliphatic dicarboxylic acid of up to 16 carbon atoms inclusive.

8. The blend of claim 7 wherein y is 0.

9. The blend of claim 7 wherein G is a moiety of propylene and the ratio of y:x is from about 0.01 to about 0.1.

10. The blend of claim 9 wherein the terminal primary diamine is of the formula

wherein n independently is an integer from 2 to 16 inclusive.

11. The blend of claim 10 wherein the dicarboxylic acid is of the formula $$HO_2C(CH_2)_mCO_2H$$

wherein m is an integer from 0 to 14 inclusive.

12. The blend of claim 11 wherein the primary diamine is hexamethylenediamine.

13. The blend of claim 12 wherein the dicarboxylic acid is adipic acid.

14. The blend of claim 11 wherein from about 25% to about 75% of the carboxylic acid groups of the acidic polymer are neutralized with zinc.

15. The blend of claim 14 wherein the primary diamine is hexamethylenediamine and the dicarboxylic acid is adipic acid.

16. The blend of claim 11 wherein the acidic polymer is a non-neutralized copolymer of ethylene and acrylic acid.

17. The blend of claim 16 wherein the primary diamine is hexamethylenediamine and the dicarboxylic acid is adipic acid.

18. The blend of claim 11 wherein the acidic polymer is a non-neutralized copolymer of ethylene and methacrylic acid.

19. The blend of claim 18 wherein the primary diamine is hexamethylenediamine and the dicarboxylic acid is adipic acid.

20. The blend of claim 1 wherein the amount of polyamide in the blend is about 1% to about 20% by weight of the total blend and the amount of acidic polymer in the blend is about 0.05% to about 10% by weight of the total blend.

* * * * *